(12) United States Patent
Mansueto et al.

(10) Patent No.: US 11,478,109 B2
(45) Date of Patent: Oct. 25, 2022

(54) BARBECUE WITH SPIT FUNCTIONALITY

(71) Applicant: Shriro Australia Pty Limited, Kingsgrove (AU)

(72) Inventors: David Mansueto, Rose Bay (AU); David Jones, Beecroft (AU); Anson Li, Rhodes (AU); Yong Quan Zhang, Foshan (CN)

(73) Assignee: Shriro Australia Pty Limited, Kingsgrove (AU)

( * ) Notice: Subject to any disclaimer, the term of this patent is extended or adjusted under 35 U.S.C. 154(b) by 183 days.

(21) Appl. No.: 16/386,937

(22) Filed: Apr. 17, 2019

(65) Prior Publication Data

US 2019/0239686 A1     Aug. 8, 2019

Related U.S. Application Data

(63) Continuation-in-part of application No. 15/763,173, filed as application No. PCT/AU2016/000345 on Oct. 13, 2016, now Pat. No. 10,905,282.

(30) Foreign Application Priority Data

Oct. 14, 2015  (AU) ................................ 2015904181
Apr. 19, 2018  (AU) ................................ 2018202755

(51) Int. Cl.
    *A47J 37/07*          (2006.01)

(52) U.S. Cl.
    CPC ....... *A47J 37/0745* (2013.01); *A47J 37/0704* (2013.01)

(58) Field of Classification Search
    CPC .. A47J 37/041; A47J 37/0704; A47J 37/0745; A47J 37/0731; A47J 37/0763
    See application file for complete search history.

(56) References Cited

U.S. PATENT DOCUMENTS 2,588,046 A    3/1952   Ridgely
2,718,845 A    9/1955   Dudley
(Continued)

FOREIGN PATENT DOCUMENTS

AU      2008350879 B2    8/2009
BR      MU8802810-0 U2    9/2010
(Continued)

OTHER PUBLICATIONS

English-language machine translation of China Patent Publication No. CN 1466429 A, Google Patents, Jan. 7, 2004.
(Continued)

*Primary Examiner* — Justin C Dodson
(74) *Attorney, Agent, or Firm* — Dascenzo Gates Intellectual Property Law, P.C.

(57) ABSTRACT

A barbecue with spit functionality, the barbecue including: a barbecue body having a first opening and a second opening; a first spit support member mounted in the first opening and settable at a storage position, in which the first spit support member is substantially contained within the barbecue body, or one or more use positions, in which the first spit support member at least partially protrudes from the barbecue body; a second spit support member mounted in the second opening and settable at a storage position, in which the second spit support member is substantially contained within the barbecue body, or one or more use positions, in which the second spit support member at least partially protrudes from the barbecue body; and a spit rod releasably engageable with the first and second spit support members when the first and second spit support members are in their respective use positions.

18 Claims, 12 Drawing Sheets

(56) References Cited

U.S. PATENT DOCUMENTS

| | | | |
|---|---|---|---|
| 3,269,299 | A | 8/1966 | Nielsen |
| 3,442,201 | A | 5/1969 | Kates |
| 3,733,999 | A | 5/1973 | Bernstein |
| 3,943,837 | A | 3/1976 | Trkla |
| 4,112,832 | A | 9/1978 | Severdia et al. |
| 4,469,019 | A | 9/1984 | Baer |
| 5,410,950 | A * | 5/1995 | Rone ............... A47J 37/041 126/25 AA |
| 5,934,180 | A | 8/1999 | Lin |
| 6,131,505 | A | 10/2000 | Lin |
| 6,330,853 | B1 | 12/2001 | Yu |
| 6,792,935 | B2 | 9/2004 | Williams et al. |
| 6,910,677 | B1 * | 6/2005 | Miller ............... B66F 3/12 254/103 |
| 7,856,924 | B1 * | 12/2010 | Stihi ............... A47J 37/0731 126/25 AA |
| 8,051,768 | B2 | 11/2011 | Stephen et al. |
| 9,775,464 | B2 | 10/2017 | Gillespie et al. |
| 2006/0144384 | A1 * | 7/2006 | Santagata ......... A47J 37/0704 126/25 A |
| 2006/0266228 | A1 * | 11/2006 | Ritterling ......... A47J 37/067 99/450 |
| 2007/0137498 | A1 * | 6/2007 | Sarich ............. A47J 37/041 99/419 |
| 2008/0229937 | A1 | 9/2008 | Stephen et al. |
| 2010/0300425 | A1 * | 12/2010 | Rees, Jr. .......... A47J 37/0786 126/25 R |
| 2013/0000629 | A1 * | 1/2013 | Christopoulos .... A47J 37/0786 126/25 AA |
| 2013/0112088 | A1 * | 5/2013 | May ............... A47J 37/07 99/421 H |
| 2013/0133527 | A1 | 5/2013 | Martin et al. |
| 2013/0206015 | A1 * | 8/2013 | Jacoby ............ A47J 37/07 99/330 |
| 2014/0069412 | A1 | 3/2014 | Garman |
| 2014/0208960 | A1 * | 7/2014 | Gillespie .......... A47J 37/042 99/421 H |

FOREIGN PATENT DOCUMENTS

| | | |
|---|---|---|
| BR | 202016027468 U2 | 6/2018 |
| CA | 2153115 A1 | 12/1996 |
| CN | 2164724 Y | 5/1994 |
| CN | 1466429 A | 1/2004 |
| CN | 201150348 Y | 11/2008 |
| CN | 101422328 A | 5/2009 |
| CN | 201782274 U | 4/2011 |
| CN | 202891085 U | 4/2013 |
| CN | 203151027 U | 8/2013 |
| CN | 203262632 U | 11/2013 |
| CN | 203898105 U | 10/2014 |
| CN | 203952827 U | 11/2014 |
| CN | 203986823 U | 12/2014 |
| CN | 104343167 A | 2/2015 |
| CN | 104665250 A | 6/2015 |
| CN | 104720301 A | 6/2015 |
| CN | 104720620 A | 6/2015 |
| CN | 204363310 U | 6/2015 |
| CN | 204410127 U | 6/2015 |
| CN | 204467461 U | 7/2015 |
| CN | 204467471 U | 7/2015 |
| CN | 104856583 A | 8/2015 |
| CN | 204561349 U | 8/2015 |
| CN | 205433418 U | 8/2016 |
| DE | 202008011643 U1 | 5/2009 |
| FR | 2298301 A | 8/1976 |
| FR | 2479676 A | 10/1981 |
| FR | 2759888 A1 | 8/1998 |
| GB | 2146235 A | 4/1985 |
| GB | 2373173 A | 9/2002 |
| TW | M321255 U | 11/2007 |
| TW | 201014551 A | 4/2010 |
| TW | M446545 U1 | 2/2013 |
| WO | WO 2009/105111 A1 | 8/2009 |

OTHER PUBLICATIONS

English-language machine translation of China Patent Publication No. CN 101422328 A, Google Patents, May 6, 2009.
English-language machine translation of Brazil Utility Model No. MU8802810-0 U2, Google Patents, Sep. 21, 2010.
English-language machine translation of China Patent Publication No. CN 104856583 A, Google Patents, Aug. 26, 2015.
English-language machine translation of China Patent Publication No. CN 104720620 A, Google Patents, Jun. 24, 2015.
English-language machine translation of FR 2298301 A, European Patent Office, dated Aug. 20, 1976.
English-language machine translation of FR 2479676 A, European Patent Office, dated Oct. 9, 1981.
English-language machine translation of FR 2759888 A1, European Patent Office, dated Aug. 28, 1998.
English-language machine translation of DE 202008011643 U1, European Patent Office, dated May 14, 2009.
English-language machine translation of CN 205433418 U, Clarivate Analytics, Aug. 10, 2016.
English-language machine translation of BR 202016027468 U2, Google Patents, Jun. 12, 2018.
Examination Report No. 1 issued in connection with Australia Patent Application No. 2018100790, IP Australia, dated Aug. 31, 2018.
Examination Report No. 1 issued in connection with Australia Patent Application No. 2018100792, IP Australia, dated Sep. 6, 2018.
Notification of Material Filed by a Third Party, submitted in connection with Australia Patent Application No. 2018100790, dated Aug. 14, 2018.
Notification of Material Filed by a Third Party, submitted in connection with Australia Patent Application No. 2018100792, dated Aug. 10, 2018.
Statement of Grounds and Particulars, submitted in connection with opposition against Australia Patent No. 2018100790, Nov. 11, 2019.
Declaration of David Trought and Exhibits DT-1 to DT-10, submitted in connection with opposition against Australia Patent No. 2018100790, Nov. 11, 2019.
Declaration of Mathew Trainor and Exhibits MT-1 to MT-7, submitted in connection with opposition against Australia Patent No. 2018100790, Nov. 11, 2019.
English-language machine translation of CN 203898105 U, Google Patents, Oct. 29, 2014.
English-language machine translation of CN 203952827 U, Google Patents, Nov. 26, 2014.
English-language machine translation of CN 2164724 Y, Google Patents, May 18, 1994.
English-language machine translation of TW M321255 U, Google Patents, Nov. 1, 2007.
English-language machine translation of CN 201150348 Y, Google Patents, Nov. 19, 2008.
English-language machine translation of TW 201014551 A, Google Patents, Apr. 16, 2010.
English-language machine translation of CN 201782274 U, Google Patents, Apr. 6, 2011.
English-language machine translation of TW M446545 U1, Google Patents, Feb. 11, 2013.
English-language machine translation of CN 202891085 U, Google Patents, Apr. 24, 2013.
English-language machine translation of CN 203151027 U, Google Patents, Aug. 21, 2013.
English-language machine translation of CN 203262632 U, Google Patents, Nov. 6, 2013.
English-language machine translation of CN 203986823 U, Google Patents, Dec. 10, 2014.
English-language machine translation of CN 104343167 A, Google Patents, Feb. 11, 2015.
English-language machine translation of CN 104665250 A, Google Patents, Jun. 3, 2015.
English-language machine translation of CN 204363310 U, Google Patents, Jun. 3, 2015.

(56) References Cited

OTHER PUBLICATIONS

English-language machine translation of CN 104720301 A, Google Patents, Jun. 24, 2015.
English-language machine translation of CN 204410127 U, Google Patents, Jun. 24, 2015.
English-language machine translation of CN 204467461 U, Google Patents, Jul. 15, 2015.
English-language machine translation of CN 204467471 U, Google Patents, Jul. 15, 2015.
English-language machine translation of CN 204561349 U, Google Patents, Aug. 19, 2015.

* cited by examiner

BARBECUE WITH SPIT FUNCTIONALITY

RELATED APPLICATIONS

This application is a continuation-in-part of and claims priority under 35 U.S.C. § 120 to U.S. patent application Ser. No. 15/763,173, which was filed on Mar. 26, 2018, and which claims priority from PCT Patent Application No. PCT/AU2016/000345, which was filed on Oct. 13, 2016. PCT Patent Application No. PCT/AU2016/000345 claims priority from Australia Patent Application No. 2015904181, which was filed on Oct. 14, 2015. The present application also claims priority under 35 U.S.C. § 119 to Australia Provisional Patent Application No. 2018202755, which was filed on Apr. 19, 2018. The complete disclosures of the above-identified patent applications are hereby incorporated by reference.

FIELD

The present invention relates to a barbecue.

The invention has been developed for use with a barbecue that has a spit functionality, and will be described hereinafter with reference to this application.

BACKGROUND OF THE INVENTION

Barbecue spits, or rotisseries, are known. They are used to cook whole or large portions of various meats. Known barbecue spits typically comprise a large rectangular container that holds charcoal or firewood, a pair of vertical supports fixed to either end of the body and a spit rod that is mounted across the vertical supports. The spit rod, which holds the meat, is rotated over the hot charcoals, thus allowing the meat to cook evenly. Rotation of the spit rod is typically driven by a motor.

A disadvantage of known barbecue spits is that they are typically bulky in size and have a number of components that require manual assembly prior to use. Also, keeping known barbecue spits assembled in a "ready to use" state is impractical and/or difficult due to their bulky size. Further, the disparate sizes and multitude of the various components makes the assembly of the barbecue spit difficult and time consuming. The process of dismantling and storing the barbecue spit, after it has been used, also requires a substantial amount of time and effort.

OBJECT OF THE INVENTION

It is an object of the present invention to substantially overcome one or more of the above disadvantages, or at least provide a useful alternative.

SUMMARY OF THE INVENTION

Accordingly, the present invention provides a barbecue with spit functionality, the barbecue including:

a barbecue body having a first opening and a second opening;

a first spit support member mounted in the first opening and settable at a storage position, in which the first spit support member is substantially contained within the barbecue body, and one or more use positions, in which the first spit support member at least partially protrudes from the barbecue body;

a second spit support member mounted in the second opening and settable at a storage position, in which the second spit support member is substantially contained within the barbecue body, and one or more use positions, in which the second spit support member at least partially protrudes from the barbecue body; and a drive means for driving or moving the first and second spit support members between their storage positions and their one or more use positions.

A spit rod is typically provided to be releasably engageable with the first and second spit support members when the first and second spit support members are in their respective use positions. The drive means is thus configured to move each of the first and second spit rod support members automatically between its respective storage position and its one or more use positions. The drive means preferably has or includes a controller with which a user or operator can control operation of the drive means. The controller will typically include at least one actuator, such as a switch, for activating and deactivating operation of the drive means. The controller is preferably configured for selectively activating and deactivating operation of the drive means thus to control movement of the first and second spit support members and thereby to select or adjust a plurality of the use positions. The use positions of the first and second spit support members are therefore preferably continuously adjustable or selectable within a range defined between a predetermined maximum height and a predetermined minimum height. It will be understood that the drive means is preferably configured to drive or move the first and second spit support members simultaneously or together between their storage positions and their one or more use positions.

In a preferred embodiment, the barbecue body includes a top surface, the first spit support member includes a top surface, and the second spit support member includes a top surface. The top surfaces of the first and second spit support members are preferably flush with the top surface of the barbecue body when the first and second spit support members are in their respective storage positions. Thus, the predetermined maximum height and predetermined minimum height between which the use positions of the first and second spit support members are adjustable or selectable are preferably determined or set with reference to the top surface of the barbecue body.

In a preferred embodiment, the drive means may comprise a rotary drive means. In this regard, for example, the drive means may comprise a motor, especially an electric motor, for moving, e.g. raising and lowering, each of the first and second spit support members between its respective storage position and its one or more use positions. Thus, the first and second spit support members are preferably motorised to facilitate movement of the first and second support members between their respective storage and one or more use positions.

In a preferred embodiment, and especially in the case of a rotary drive means, such as an electric motor, the drive means may include a transmission for transmitting or converting the rotary motion of the motor to a linear displacement or translation of each of the first and second spit support members. In this regard, for example, the drive means may include a worm gear or a screw drive as a transmission driven by the motor for raising and lowering the first and second spit support members between their storage positions and their one or more use positions. As an alternative, the drive means may include a rack and pinion transmission driven by the motor to raise and lower the first and second spit support members between the storage position and the one or more use positions. Other transmissions are also contemplated, as will be understood by persons skilled in the art.

In another preferred embodiment, the drive means comprises a linear drive means for linearly driven displacement of the first and second spit support members between their storage positions and their one or more use positions. Such a linear drive means could, for example, comprise a piston drive or a solenoid drive for linearly driven displacement of the first and second spit support members.

In a preferred embodiment, the drive means comprises an electric drive means. In this connection, as noted above, the drive means could be provided as an electric motor or as a solenoid actuator. In an alternative embodiment, however, the drive means could comprise a hydraulic drive means or a pneumatic drive means for raising and lowering the first and second spit support members between the storage position and the one or more use positions. In this regard, the drive means could be embodied in the form of a pneumatic piston or a hydraulic piston.

The first and second spit support members are preferably settable at one or more use positions, in which they partially protrude from the barbecue body by varying amounts.

The barbecue body preferably includes a storage compartment. The barbecue body preferably includes one or more storage doors to provide access to the storage compartment. The barbecue body preferably includes a grill area adapted to receive charcoal or firewood. The grill area preferably includes a grill interior and a grill rack. The barbecue body preferably includes a plurality of ventilation slots. The barbecue preferably further includes a plurality of legs to support the barbecue body.

BRIEF DESCRIPTION OF THE DRAWINGS

Preferred embodiments of the invention will now be described, by way of examples only, with reference to the accompanying drawings, in which.

DESCRIPTION OF EMBODIMENTS

Figure 1:
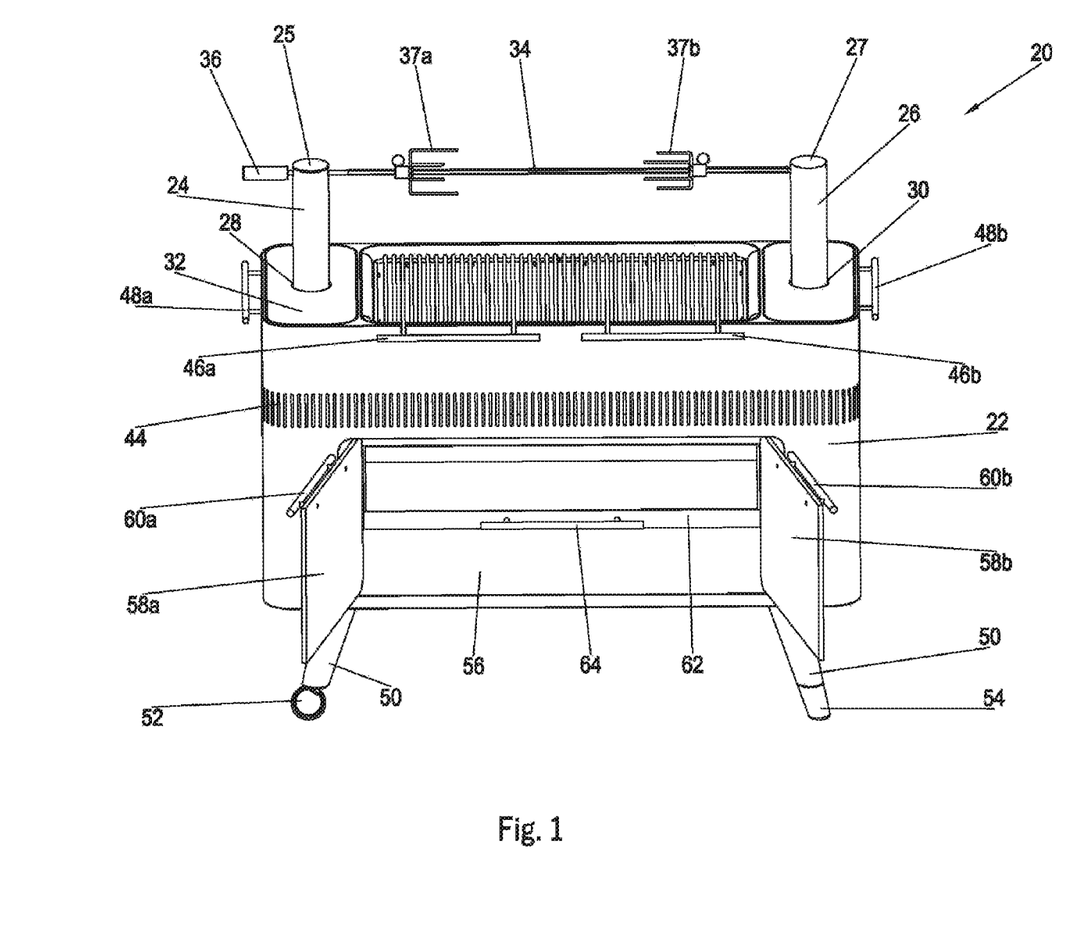
FIG. 1 is a front perspective view of a first embodiment of a barbecue with spit functionality, with the first and second spit support members in a use configuration.

FIG. 1 shows a first embodiment of a barbecue 20 with spit functionality. The barbecue 20 is in a free-standing form and includes a barbecue body 22, a first spit support member 24 and a second spit support member 26. The barbecue body 22 has a height of approximately 640 mm, a length of approximately 1265 mm, and a width of approximately 500 mm. The barbecue body 22 has a first opening 28, a second opening 30 and a top surface 32. The first spit support member 24 is mounted in the first opening 28 and the second spit support member 26 is mounted in the second opening 30. The first and second spit support members 24 and 26 include top surfaces 25 and 27, respectively.

Figure 4A:
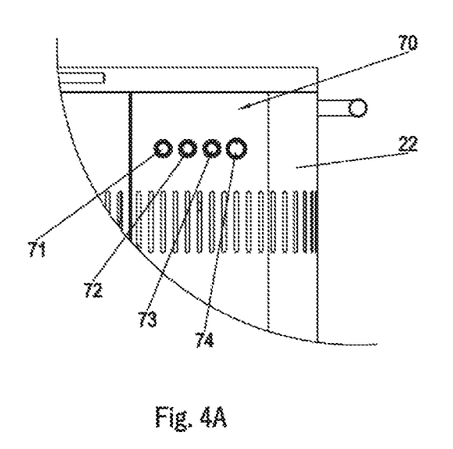
FIG. 4A is an enlarged view of control buttons of the barbecue shown in FIG. 1.
Figure 4B:
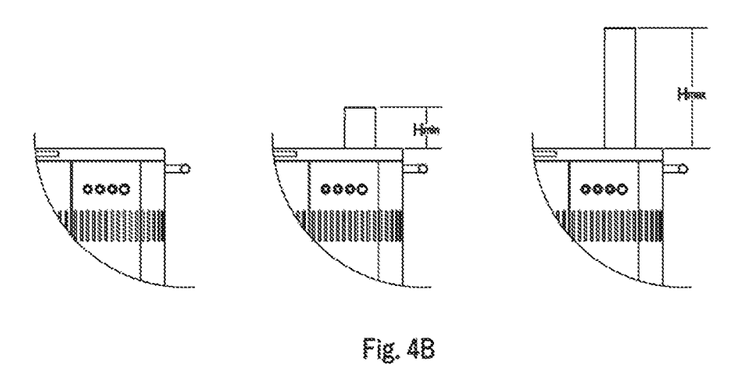
FIG. 4B shows height differences of the second spit support member when in the storage position and one of its use positions, respectively.

FIG. 4A shows a control panel 70 having control buttons 71, 72, 73 and 74 provided on or attached to the body 22 of the barbecue 20. The buttons 71-74 allow the user to control various functions of the barbecue 20, which will be described below. FIG. 4B shows the front of the barbecue 20 with the second spit support member in: a storage position; a minimum height in the use position; and a maximum height in the use position (left to right).

Figure 5A:
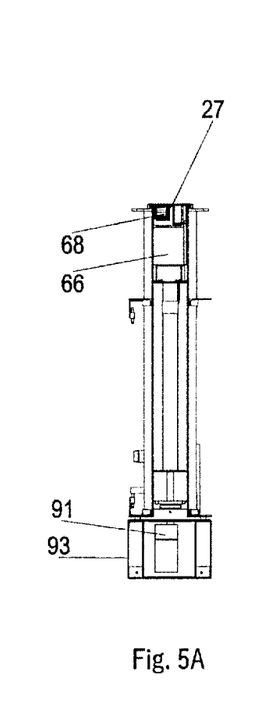
FIGS. 5A to 5C are front cross-sectional views of the first spit support member of the barbecue shown in FIG. 1, in or just moving out of its storage position.
Figure 5B:
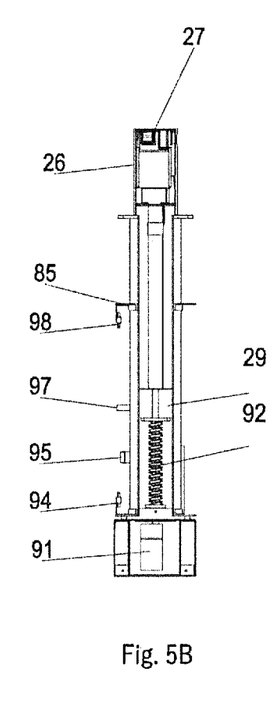
Figure 5C:
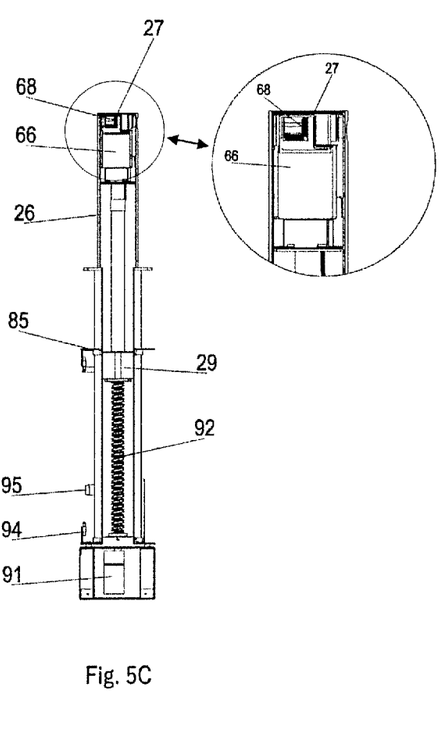

As can be seen in FIGS. 5A to 5C, the first spit support member 24 has a hollow body, which houses a spit motor 66 and a gear drive 68. The gear drive 68 includes a square socket opening therein. The second spit support member 26 also has a hollow body, which houses an injection moulded plastic cradle support therein.

Returning to FIG. 1, the barbecue 20 also includes a spit rod 34, of square cross-section, which is mounted on the first and spit second support members 24 and 26. The spit rod 34 includes a handle 36 and spit forks 37a and 37b. The barbecue body 22 includes a grill area 38 having a grill interior 40 and a grill rack 42 (shown in FIG. 2). The barbecue body 22 further includes a plurality of ventilation slots 44, front handles 46a and 46b, side handles 48a and 48b, and legs 50. The legs 50 include castor wheels 52 on one side of the barbecue body 22, and rubber heels 54 on the other side of the barbecue body 22. The legs 50 have a height of approximately 260 mm.

As shown in FIG. 1, the barbecue body 22 further includes a storage compartment 56. Storage doors 58a and 58b provide access to the storage compartment 56 and include door handles 60a and 60b. The barbecue body 22 further includes a drip tray 62 that is mounted within the storage compartment 56. The drip tray 62 includes a tray handle 64.

Figure 6:
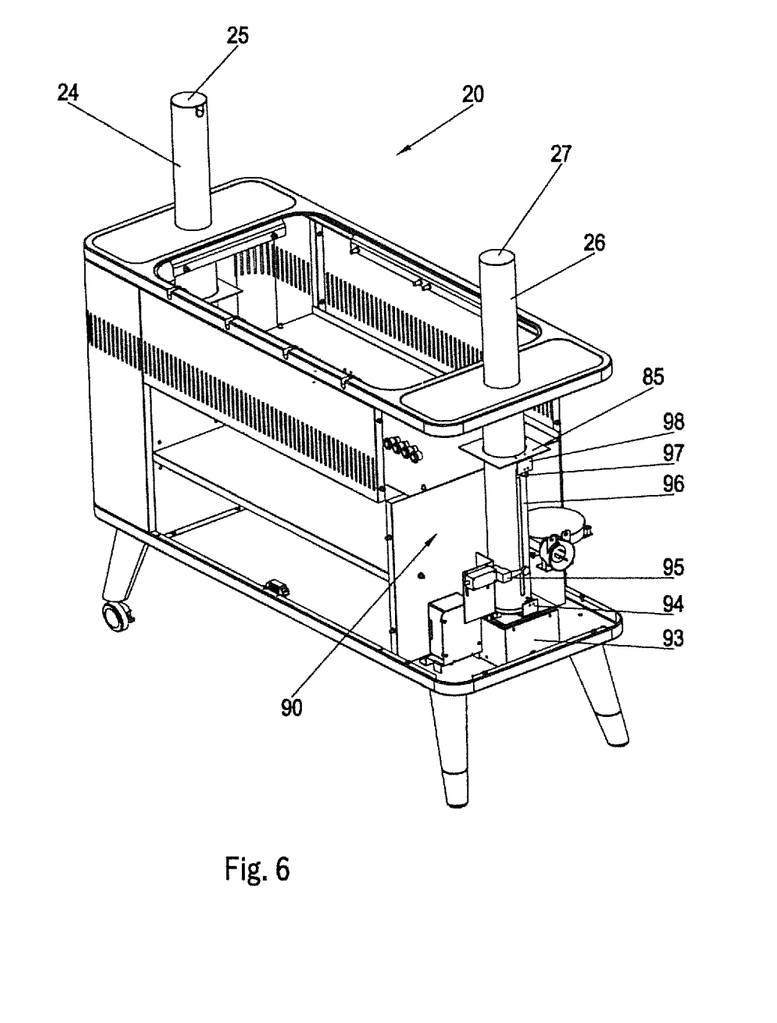
FIG. 6 is a cut-away view of the barbecue shown in FIG. 1, revealing a drive means for driving or moving the first and second spit support members.
Figure 7A:
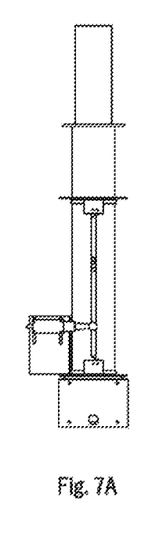
FIGS. 7A to 7E are front, left, rear, perspective and top views, respectively, of the drive means shown in FIG. 6.
Figure 7B:
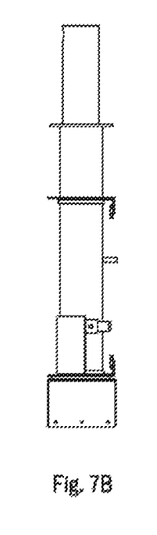
Figure 7C:
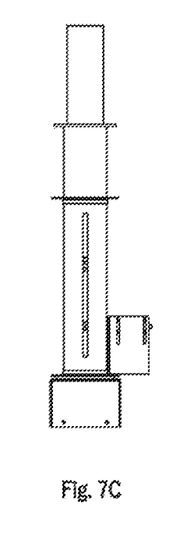
Figure 7D:
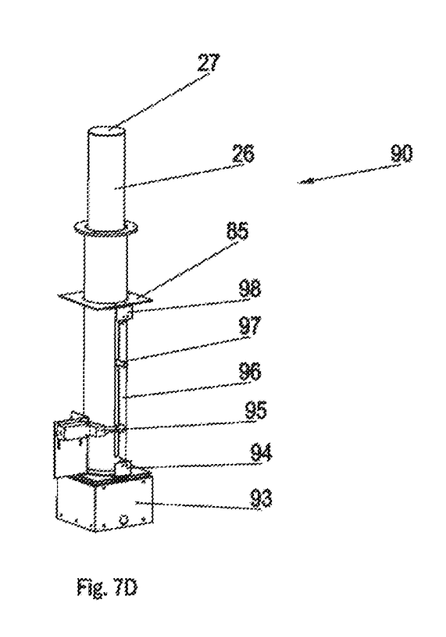
Figure 7E:
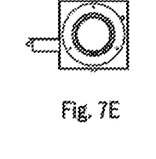
Figure 8:
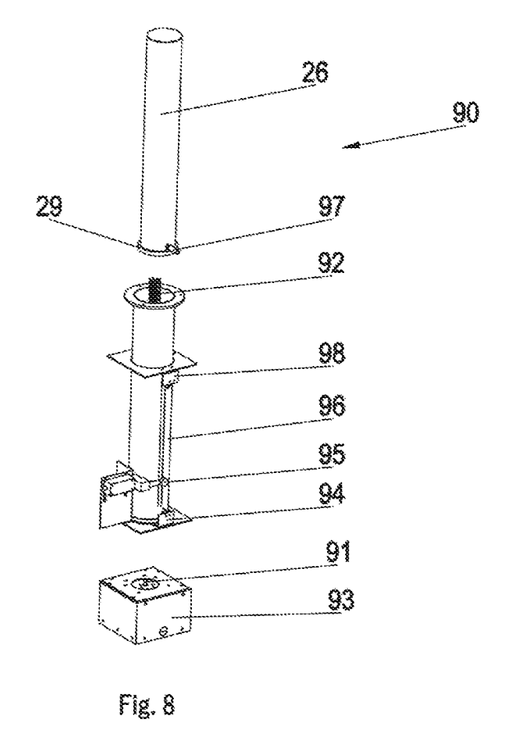
FIG. 8 is an exploded view of the drive means shown in FIG. 6.
Figures 9A, 9B, 9C:
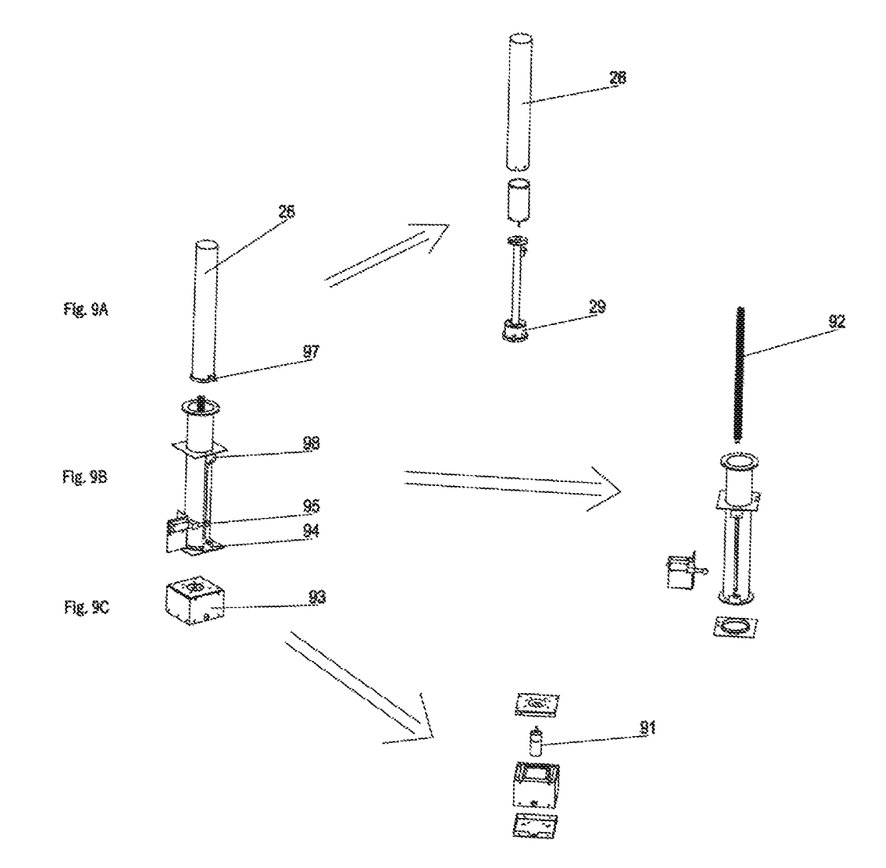
FIGS. 9A to 9C are further exploded views of the drive means shown in FIG. 6.

FIG. 6 shows drive means 90 mounted to the inside of the barbecue 20, via a bracket 85 for driving or moving the second spit support member 26 between the storage position and each of its use positions. As perhaps best seen in FIGS. 9A-9C, the drive means 90 comprises an electric motor 91 and a transmission 92 provided in the form of a worm drive mechanism for transferring or converting the rotary motion of the electric motor 91 into a linear displacement or translation of the second spit support member 26. It will be understood by persons skilled in the art that, instead of the worm drive mechanism, the transmission 92 could alternatively be provided by a rack and pinion mechanism or a screw drive mechanism. An identical drive means 90 is located on the opposite side of the barbeque 20 for driving or moving the first spit support member 24 between its storage position and each of its use positions. The drive means 90 generally includes a drive motor box assembly 93, a lower stroke switch 94, a safety limit stroke switch 95, an outer spit support member assembly 96, a stroke pin 97 and an upper stroke switch 98. FIGS. 7A to 7E show the drive means when not mounted to the barbecue 20.

The functionality of the barbecue 20 will now be described.

FIG. 1 shows the barbecue 20 in a use configuration. The first and second support members 24 and 26 are in their respective use positions, in which they protrude from the barbecue body 22. The spit rod 34 is mounted and secured to an upper portion of the first and second spit support members 24 and 26 with one end engaged with the square socket opening in the first support member 24 and the other end engaged in the plastic cradle support in the second support member 26. The positions of the spit forks 37a and 37b are adjustable along the length of the spit rod 34 so as to secure different types and sizes of meat. The grill area 38 is located below the spit rod 34. The grill interior 40 is adapted to receive charcoal or firewood to cook the meat on the spit rod 34, and the grill rack 42 prevents any excess meat falling off the spit rod 34 from entering the grill interior 40. The grill rack 42 can also be used to cook smaller portions of meat separate from the spit rod 34. The ventilation slots 44 allow for ventilation of air in and out of the barbecue body 22 to facilitate the burning of the charcoal or firewood in the grill interior 40.

The storage compartment 56 can be used to store the spit rod 34 and/or other barbecue accessories, and is accessible from the front of the barbecue 22 via the storage doors 58a and 58b. The drip tray 62 holds any oils or fats that drip from the meat being cooked on the spit rod 34.

Figure 2:
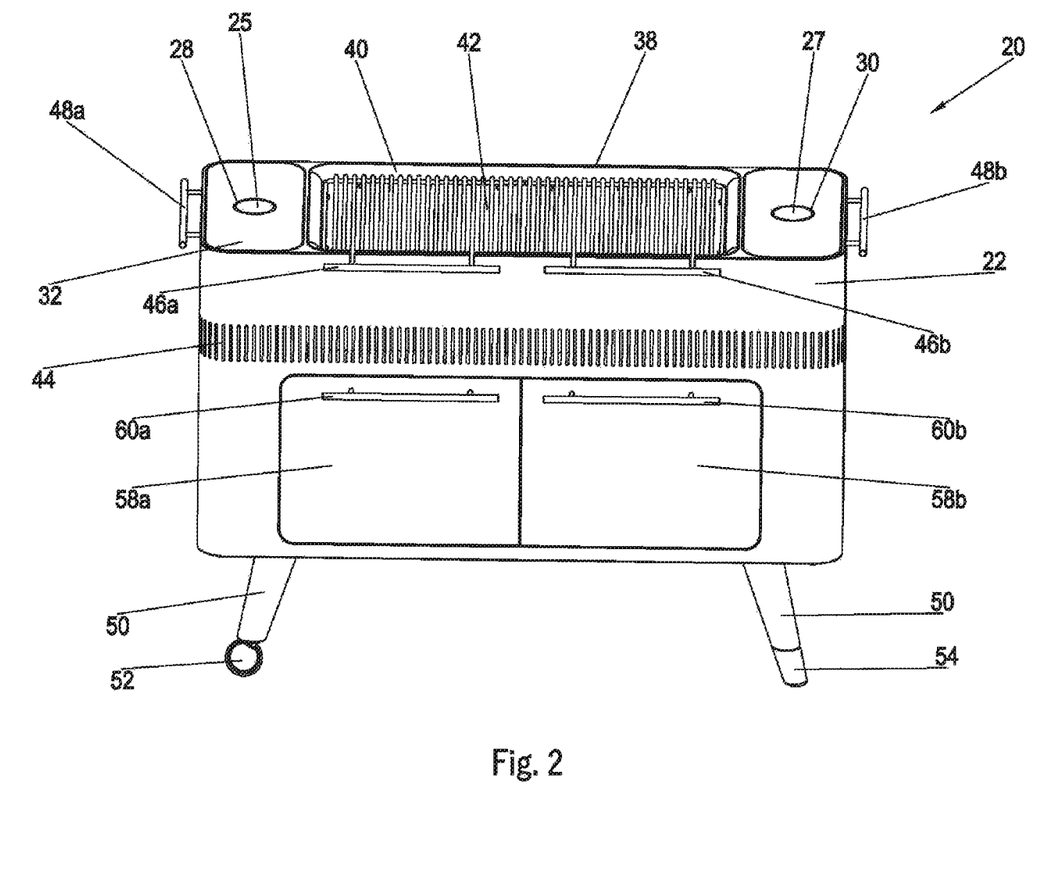
FIG. 2 is a front perspective view of the barbecue shown in FIG. 1, with the first and second spit support members in a storage configuration.
Figure 3A:
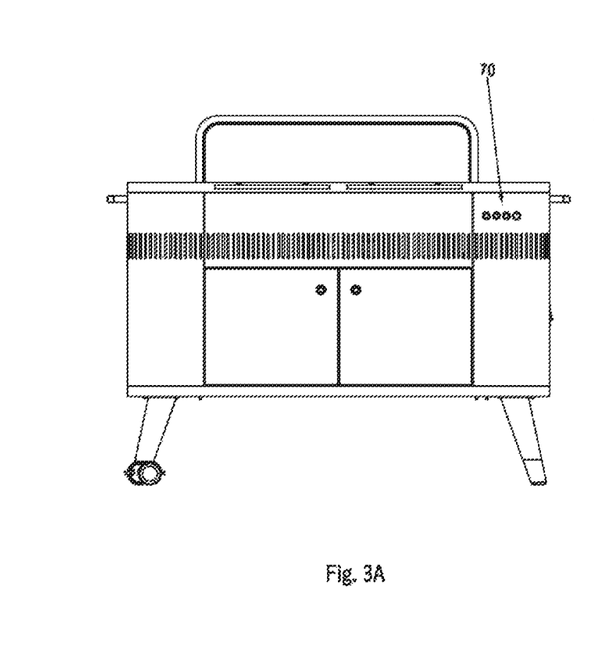
FIGS. 3A and 3B are front and perspective views respectively of the barbecue shown in FIG. 1, with the first and second spit support members in their storage positions.
Figure 3B:
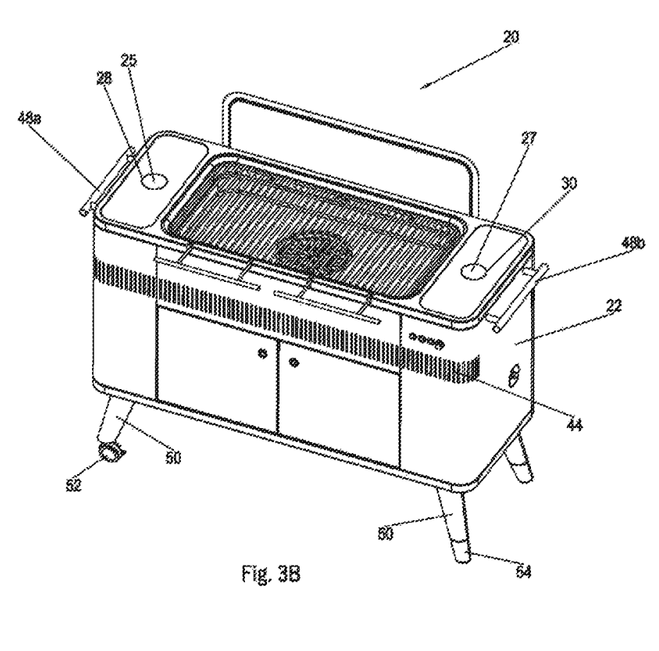

FIGS. 2 and 3A-3B show the barbecue 20 in a storage configuration. In this configuration, the first and second spit support members 24 and 26 are in their respective storage positions, in which they are substantially contained within the barbecue body 22. Further, the top surfaces 25 and 27 of the first and second spit support members 24 and 26 are flush with the top surface 32 of the barbecue body 22. The storage doors 58a and 58b are shut to securely contain the spit rod 34, drip tray 62 and other accessories within the storage compartment 56.

As will be described in more detail below, the first and second spit support members 24 and 26 are moveable between their respective use and storage positions, thereby allowing the barbecue 20 to be in either of the use or storage configurations described above. Additionally, the first and second spit support members 24 and 26 can be positioned relative to the barbecue body 22 at any location along their respective lengths so as to define continuously variable spit roasting heights, based on user input through the control panel. The movement of the first and second spit support members 24 and 26 is facilitated by the drive means located within the barbecue body 22.

As shown in FIGS. 6 to 9C, the motor 91 is located within the drive motor box assembly 93. The shaft of motor 91 protrudes upwardly from the drive motor box assembly 93 and is connected to a first end of the worm drive transmission 92, which is positioned longitudinally inside of the outer spit support member assembly 96 and the second spit support member 26. A second end of the worm drive mechanism 92 is connected to a base 29 of the spit support member 26. Rotation of the motor 91 in clockwise and anticlockwise directions raises and lowers the second spit support member 26 between the storage position and its use positions. The base 29 is engaged and driven by the worm drive transmission 92 of the drive means 90, which in turn raises and lowers the second spit support member 26. A substantially identical arrangement of this drive means 90 is provided for raising and lowering the first spit support member 24.

Referring to FIGS. 4A-4B and 7A-7E, when the second spit support member 26 is at a maximum use height $H_{max}$ the stroke pin 97, which protrudes from a guide slot of the outer spit support member assembly 96, is in contact with or in proximity to the upper stroke switch 98. The upper stroke switch 98 sends a signal to a processor or a printed circuit board (PCB), not shown, provided in the control panel 70 which in turn deactivates or de-energises the motor 91, thereby preventing further raising of the second spit support member 26 using rotary knob 74 beyond the upper limit $H_{max}$ of the worm drive transmission 92. Similarly, when the second spit support member 26 is at a minimum use height $H_{min}$, the stroke pin 97 is in contact with or in proximity to safety limit stroke switch 95. The safety limit stroke switch 95 sends a signal to the processor or PCB which in turn de-energises the motor 91, thereby preventing further lowering of the second spit support member 26 using rotary knob 74. It is only when the second spit support member 26 is in the lowest use position (i.e. $H_{min}$) that the home button 73 can be used to return the second spit support member 26 to the storage position, due to the contact or proximity of the stroke pin 97 with the safety limit stroke switch 95. It will be appreciated that a safety switch located inside of the first and/or second spit support member 24, 26 to detect the presence of the spit rod 34 and to disable the drive means 90 via the control panel 70 is desirable to prevent the first and second spit support members 24 and 26 from being lowered to the storage position using the home button 73 while the spit rod 34 is still engaged with the spit support members 24, 26. It is envisaged that such a safety switch may sound an alarm or otherwise alert the operator to the problem, in addition to disabling or de-energising the button 73 to prevent accidental lowering of the spit support members 24, 26 while the spit rod 34 is still engaged.

The user sets the first and second support members 24 and 26 at a desired spit roasting height using the button or rotary knob 74 which activates the motor 91 and the worm drive transmission 92. The worm drive transmission 92 drives the base 29, which in turn drives the first and second spit support members 24, 26 between the storage position and a desired spit roasting height. It is thus envisaged that the operator will be able to adjust the spit rod 34 to any desired spit roasting height between $H_{min}$ and $H_{max}$ via the button or rotary knob 74. The meat to be cooked is then attached to the spit rod 34. The spit forks 37a and 37b are adjusted along the length of the spit rod 34 to secure the meat there-between. The spit rod 34 is then mounted and secured to the first and second support members 24 and 26. The user then presses the power button 72 on the control panel 70 to energise the spit motor 66 and the gear drive 68. The spit rod 34 then rotates over the charcoal or firewood in the grill area 38, allowing the meat to be cooked evenly. The button 71 on the control panel is used to energise an element, which thereby ignites charcoals or firewood received by the grill interior 40.

As noted above, in an alternative embodiment, the transmission 92 of the drive means 90 may comprise a standard rack and pinion arrangement instead of a worm drive mechanism, as discussed above. The rack would be attached to the base 29 and move with the respective first and second spit support members 24, 26 when the pinion is driven by the electric motor 91, so as to provide the operator with selectively adjustable spit roasting heights between $H_{min}$ and $H_{max}$.

In further preferred embodiments, it is also envisaged that the control panel 70 may be operated through an application on a portable device, such as a mobile phone or tablet, of the operator. It is envisaged that the processor or PCB located in the control panel 70 may have a wireless local area network (WLAN) to which the user can connect using their portable device. Once connected to the wireless network, the user may then operate the buttons 71-74 described above remotely.

Figure 10:
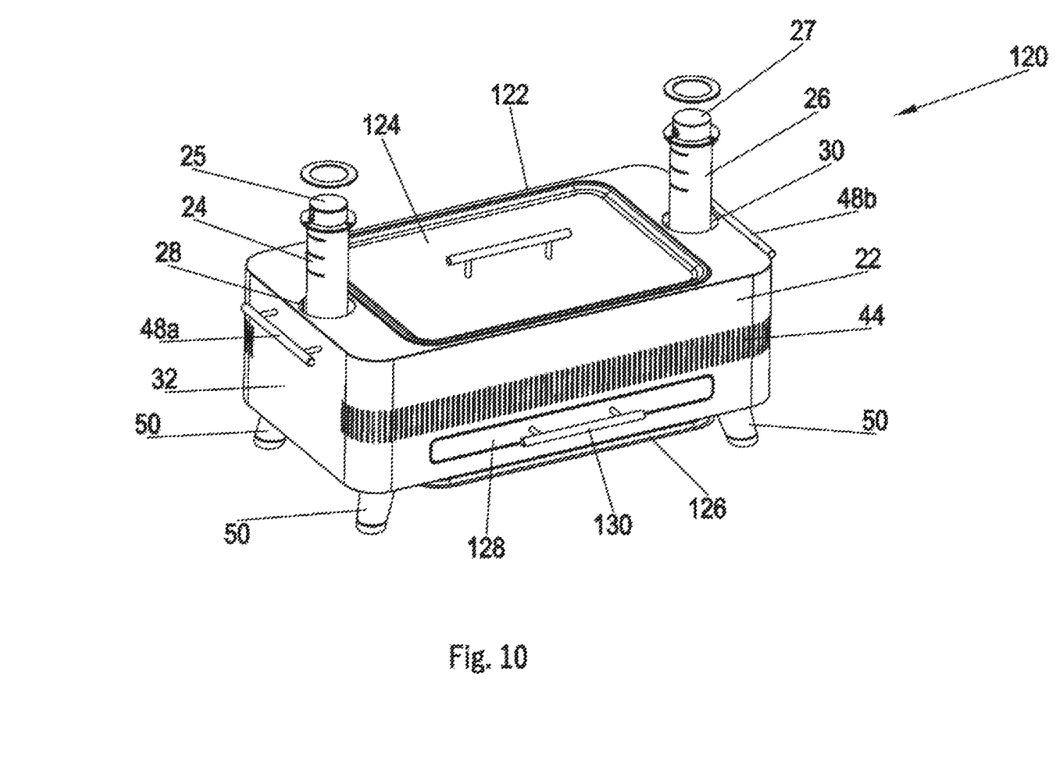
FIG. 10 is a perspective view of a second embodiment of a barbecue with spit functionality, with the first and second spit support members in a use configuration.

FIG. 10 shows a second embodiment of a barbecue 120 with spit functionality, in a use configuration. The barbecue 120 is in a table-top form and is somewhat similar to the barbecue 20, with like reference numerals being used to indicate like features. However, the barbecue body 22 has a height between about 200 to 225 mm, a length of approximately 840 mm, and a width of approximately 460 mm. The legs 50 have a height of approximately 80 mm. The barbecue body 22 includes a smaller grill area 122 instead of the grill area 38. The grill area 122 includes a grill lid 124. The barbecue body 22 also includes a grill lid storage area 126 located below the barbecue body 22. The storage compartment 56 is accessible by way of a storage drawer 128, which includes a drawer handle 130.

Figure 11:
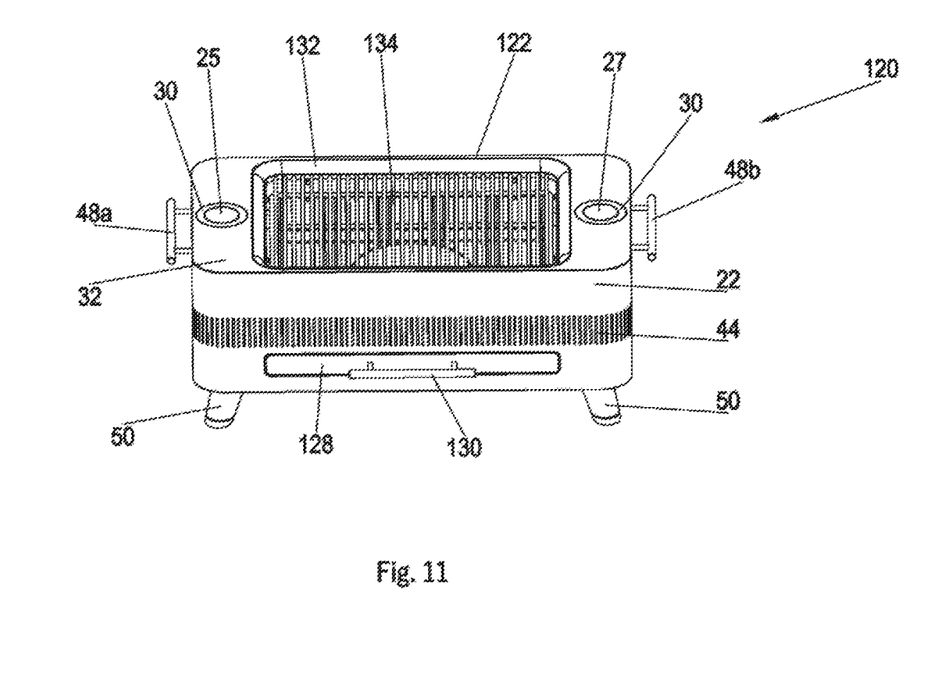
FIG. 11 is a perspective view of the barbecue shown in FIG. 10, with the first and second spit support members in a storage configuration.

FIG. 11 shows the barbecue 120 in a storage configuration. The grill area 122 includes a table-top grill interior 132 and a table-top grill rack 134.

Figure 12:
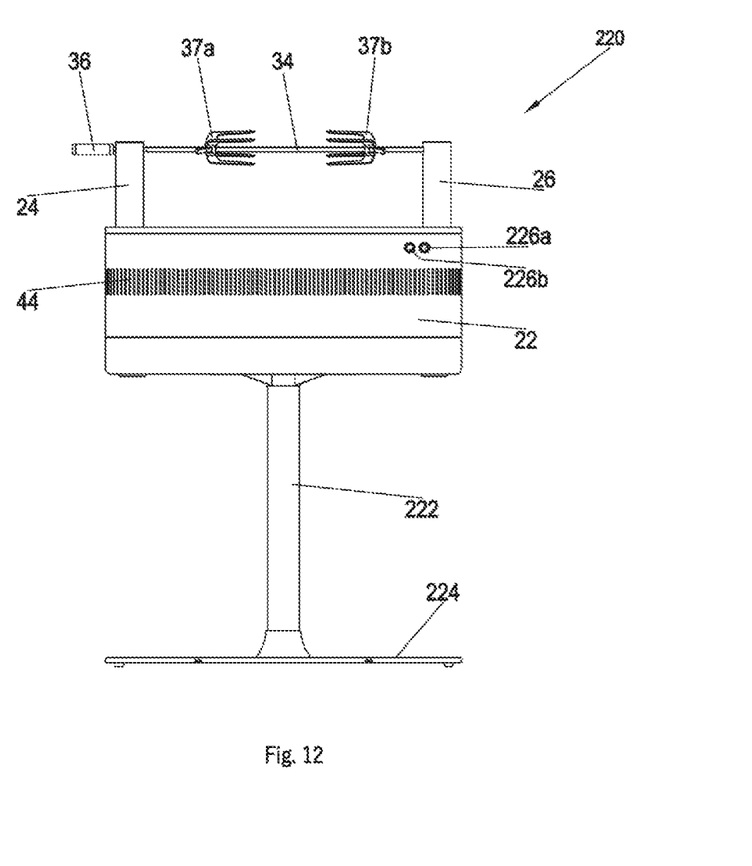
FIG. 12 is a side view of a third embodiment of a barbecue with spit functionality, with the first and second spit support members in a use configuration.

FIG. 12 shows a third embodiment of a barbecue 220 with spit functionality, in a use configuration. The barbecue 220 is substantially identical to the table-top form of the barbecue 120, with like reference numerals being used to indicate like features. However, the barbecue 220 includes a pedestal stand 222 to support and elevate the barbecue body 22 from the ground. The pedestal stand 222 includes a base 224. In this embodiment, the pedestal stand 222 has a height of approximately 592 mm, whilst the barbecue body 22 has a height of approximately 232 mm, a length of approximately 730 mm and a width of approximately 410 mm. The barbecue 220 also includes power buttons 226a, 226b located on a side surface of the barbecue body 22.

The barbecues described above have a number of advantages. Firstly, when the barbecues are in their storage configurations, their various components are stored away inside the barbecue body itself. This provides for a smaller, less bulky, and more visually appealing form of a spit barbecue, which can also be used as an outdoor table for serving food and drinks. Additionally, the various barbecue components are maintained in a "ready to use" state, and can thus easily be assembled, which reduces the time and effort that is normally required to set up a spit barbecue. When the barbecues are in their use configurations, the spit support members and spit forks are adjustable to different heights and lengths using a motor to suit the type and size of meat that is being cooked. A further advantage of electrically adjustable spit roasting heights is that the user can adjust the height of the spit rod whilst cooking meat, thus allowing the user to vary the rate at which the meat is being cooked. It would be more inconvenient for the user to adjust the hot spit rod without electrically adjustable spit support members. The barbecue body also has handles and legs fitted with wheels, which allows a user to easily transport the barbecue from one location to another.

Although the invention has been described with reference to preferred embodiments, it will be appreciated by persons skilled in the art that the invention may be embodied in many other forms. For example, in another embodiment (not shown) the barbecue body has a height of approximately 400 mm, a length of approximately 1545 mm, and a width of 500 mm.

The invention claimed is:

1. A barbecue with spit functionality, the barbecue including:
   a barbecue body comprising a horizontal top surface having a first opening and a second opening;
   a first spit support member mounted in the first opening and settable at a respective storage position, in which the first spit support member is contained within the barbecue body, and one or more use positions, in which the first spit support member at least partially protrudes from the horizontal top surface of the barbecue body;
   a second spit support member mounted in the second opening and settable at a respective storage position, in which the second spit support member is contained within the barbecue body, and one or more use positions, in which the second spit support member at least partially protrudes from the horizontal top surface of the barbecue body;
   a drive means for driving or moving the first and second spit support members between their respective storage positions and their respective one or more use positions, wherein the drive means includes at least one motor for selectively raising and lowering the first and second spit support members between their respective storage positions and their respective one or more use positions;
   wherein the first spit support member and the second spit support member are configured to telescopically extend along a vertical direction from their respective storage positions to their respective one or more use positions, and wherein the first spit support member and the second spit support member are configured to telescopically retract along the vertical direction from their respective one or more use positions to their respective storage positions; and
   wherein the barbecue further comprises an upper stroke switch and a stroke pin, wherein the upper stroke switch is mounted to the barbecue body proximate to the first spit support member or the second support member and configured to de-energize the at least one motor when the respective spit support member is positioned in a maximum height use position of the one or more use positions, and further wherein the stroke pin protrudes from a guide slot of the respective spit support member and is configured to actuate the upper stroke switch to de-energize the at least one motor when the respective spit support member is in the maximum height use position.

2. The barbecue according to claim 1, wherein the first spit support member includes a top surface, and the second spit support member includes a top surface, the top surfaces of the first and second spit support members being flush with the horizontal top surface of the barbecue body when the first and second spit support members are in their respective storage positions.

3. The barbecue according to claim 1, wherein the drive means further includes a transmission for transmitting or converting rotary motion of the motor to a linear displacement or translation of the first and second spit support members.

4. The barbecue according to claim 3, wherein the transmission comprises at least one of a worm gear transmission, a screw drive transmission, and a rack and pinion transmission driven by the at least one motor for raising and lowering the first and second spit support members between their respective storage positions and their respective one or more use positions.

5. The barbecue according to claim 1, wherein the respective one or more use positions of the first and the second spit support members includes a respective plurality of use positions, wherein the drive means comprises a controller with at least one actuator for selectively activating and deactivating operation of the drive means to control movement of the first and second spit support members thereby to selectively and/or continuously adjust their respective plurality of use positions within a range between the maximum height and a predetermined minimum height.

6. The barbecue according to claim 5, wherein the controller is adapted or configured to be operated through an application on a portable electronic device.

7. The barbecue according to claim 1, wherein the first and second spit support members are settable at the respective one or more use positions, in which they partially protrude from the barbecue body by varying amounts.

8. The barbecue according to claim 1, wherein the barbecue body includes a storage compartment.

9. The barbecue according to claim 8, wherein the barbecue body includes one or more storage doors to provide access to the storage compartment.

10. The barbecue according to claim 1, wherein the barbecue body includes a grill area adapted to receive charcoal or firewood.

11. The barbecue according to claim 10, wherein the grill area includes a grill interior and a grill rack.

12. The barbecue according to claim 1, wherein the barbecue body includes a plurality of ventilation slots.

13. The barbecue according to claim 1, further including a plurality of legs to support the barbecue body.

14. The barbecue according to claim 1, further comprising a spit rod releasably engageable with the first and second spit support members when the first and second spit support members are in their respective use positions.

15. The barbecue according to claim 1, wherein the motor is an electric motor.

16. The barbecue according to claim 5, wherein the at least one actuator comprises a switch.

17. The barbecue according to claim 6, wherein the portable electronic device includes a mobile phone or a tablet device.

18. The barbecue according to claim 1, further comprising a spit drive motor housed within the first spit support member or the second spit support member and configured to be contained within the barbecue body when the respective spit support member is in the respective storage position.

* * * * *